United States Patent [19]

Marchant

[11] Patent Number: 4,612,626
[45] Date of Patent: Sep. 16, 1986

[54] METHOD OF PERFORMING REAL INPUT FAST FOURIER TRANSFORMS SIMULTANEOUSLY ON TWO DATA STREAMS

[75] Inventor: Jeffrey D. Marchant, Chandler, Ariz.

[73] Assignee: Motorola Inc., Schaumburg, Ill.

[21] Appl. No.: 565,991

[22] Filed: Dec. 27, 1983

[51] Int. Cl.[4] .................................. G06F 15/332
[52] U.S. Cl. ................................................ 364/726
[58] Field of Search ....................................... 364/726

[56] References Cited

U.S. PATENT DOCUMENTS

| | | | |
|---|---|---|---|
| 3,466,431 | 9/1969 | Fuchs et al. | |
| 3,588,460 | 6/1971 | Smith | 364/726 |
| 3,638,004 | 1/1972 | Sloane et al. | 364/726 |
| 3,721,812 | 3/1973 | Schmidt | 364/726 |
| 3,783,258 | 1/1974 | Chwastyk | 364/726 |
| 3,803,391 | 4/1974 | Vernet | 364/726 |
| 3,876,946 | 4/1975 | Clair | 364/726 |
| 4,117,541 | 9/1978 | Ali | 364/724 |
| 4,138,730 | 2/1979 | Ali | 364/726 |
| 4,199,660 | 4/1980 | Dill et al. | 370/50 |

Primary Examiner—David H. Malzahn
Attorney, Agent, or Firm—Jonathan P. Meyer

[57] ABSTRACT

Simultaneous FFT's are calculated for two real input sequences utilizing a two channel recursive FFT structure. The method of operating such a structure disclosed includes the $\log_2 N$ stages (for an N-point transform) known in the prior art plus a final unscrambling stage. A method of arranging the outputs of the $\log_2 N$-th stage for use as inputs to the unscrambling stage is disclosed which results in substantially unscrambled FFT outputs for the two sequences without the need for extra unscrambling hardware.

4 Claims, 3 Drawing Figures

2

METHOD OF PERFORMING REAL INPUT FAST FOURIER TRANSFORMS SIMULTANEOUSLY ON TWO DATA STREAMS

FIELD OF THE INVENTION

The present invention relates, in general, to the performance of the Fast Fourier Transforms (FFT's) of sequences of digital data. More particularly, the invention relates to a method of utilizing a recursive, two channel FFT structure to simultaneously perform FFT's of two real data sequences without the necessity of using extra hardware to unscramble the outputs.

BACKGROUND OF THE INVENTION

Many radar, sonar, telecommunication and other systems require the computation of Fourier Transforms. As a result, many computational devices and methods exist. For instance, one common structure, which is based on the radix 2 Cooley-Tukey algorithm, involves recursively performing two complex multiplications with reordering between stages. This structure includes two channels, commonly referred to as the I- and Q-channels, to accommodate the real and imaginary parts of complex inputs.

When such a structure is used to implement real input FFT's, one channel is typically zeroed out, thereby wasting half of the hardware. It has been shown that this waste may be partially avoided by feeding a second real sequence to the previously unused channel simultaneously with the first. However, this technique results in a scrambled output. In other words, the FFT outputs corresponding to the two input sequences are intermixed. This necessitates extra hardware to unscramble the output and offsets most or all of the increased efficiency realized by simultaneously processing two data sequences.

SUMMARY OF THE INVENTION

Accordingly, it is an object of the present invention to provide an improved method of performing real input FFT's.

A further object of the present invention is to provide a method of simultaneously performing FFT's on two real data sequences in a recursive structure without the necessity of unscrambling hardware.

Yet a further object of the present invention is to provide a method of utilizing a two channel recursive FFT structure to simultaneously process two sequences of real data and produce unscrambled outputs.

A particular embodiment of the present invention comprises a method of operating a two channel, recursive FFT structure which implements the radix 2 Cooley-Tukey algorithm. Two real data sequences are fed into the two channels of the device in a predetermined pair arrangement. Each channel performs a complex multiplication on each pair and provides the results to a memory structure. A memory controller addresses the memory structure so that the properly reorder pairs are fed back into the two channels. After a number of passes through the structure equal to the base two logarithm of the number of points in the transform, a scrambled output is produced. This output is also supplied to the memory structure which is once more addressed in a predetermined manner by the controller. After one more pass through the complex multipliers, a substantially unscrambled output is produced. Only a wiring change and an optional inversion are required to obtain a fully unscrambled output.

The present invention provides a method of utilizing a two channel recursive FFT structure to perform real input transforms in a highly efficient manner. These and other objects and advantages of the present invention will be apparent to one skilled in the art from the detailed description below taken together with the drawings.

DETAILED DESCRIPTION OF THE INVENTION

Figure 1:
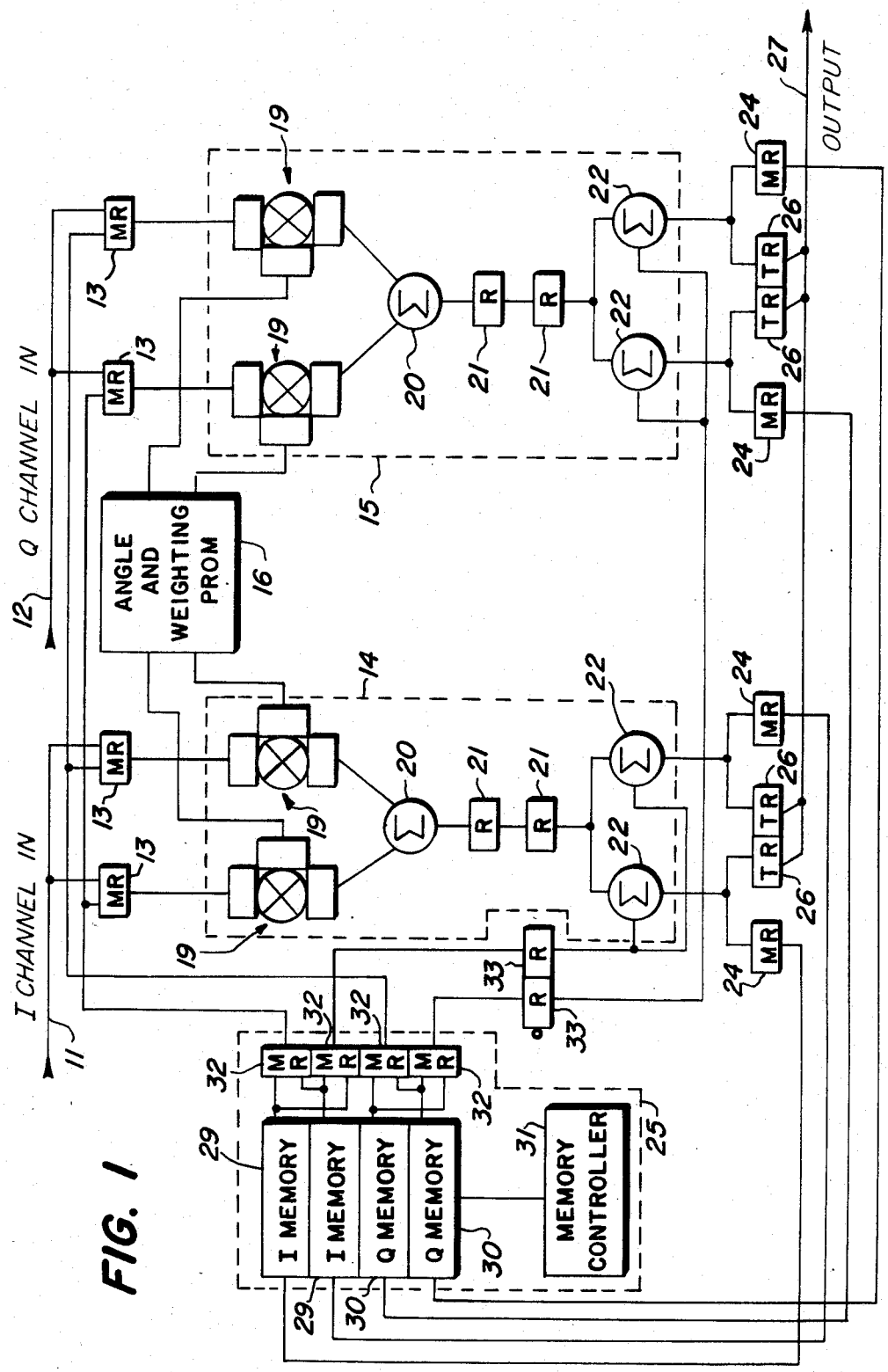
FIG. 1 is a detailed block diagram of a two channel recursive FFT structure.

Consider a real sequence $x(n)$, where $0 \leq n \leq N-1$. By definition the Discrete Fourier Transform of this sequence may be represented by the function:

$$\chi(k) = \sum_{n=0}^{N-1} x(n) \exp\left[-j\frac{2\pi}{N} nk\right]. \tag{1}$$

It is well known that the function defined by equation 1 may be restated as separate real and imaginary parts. The real part of equation (1) can be restated as:

$$Re\chi(k) = \sum_{n=0}^{N-1} x(n) \cos\left(\frac{2\pi}{N} nk\right). \tag{2}$$

Furthermore, it is well known that the real part of the transform is an even function; that is:

$$Re\chi(k) = Re\chi(N-k). \tag{3}$$

Similarly, the imaginary part of the transform is:

$$Im\chi(k) = \sum_{n=0}^{N-1} x(n) \sin\left(\frac{2\pi}{N} nk\right), \tag{4}$$

which is an odd function.

$$Im\chi(k) = -Im\chi(N-k). \tag{5}$$

Now consider two real sequences of length N, $x_1(n)$ and $x_2(n)$. Define a complex sequence $g(n)$ such that:

$$g(n) = x_1(n) + jx_2(n) \tag{6}$$

It is well known that the fourier transform of the complex sequence $g(n)$ is equal to the sum of the transform of the first real sequence, $x_1(n)$, and $j$ times the transform of the second real sequence, $x_2(n)$.

$$G(k) = \chi_1(k) + j\chi_2(k). \tag{7}$$

Utilizing this fact and the odd and even properties of the functions described above, it is possible to derive the following set of four equations.

$$2Re\chi_1(k) = ReG(k) + ReG(N-k), \quad (8a)$$

$$2Im\chi_1(k) = ImG(k) - ImG(N-k), \quad (8b)$$

$$2Re\chi_2(k) = ImG(k) + ImG(N-k), \text{ and} \quad (8c)$$

$$2Im\chi_2(k) = ReG(N-k) - ReG(k). \quad (8d)$$

These four equations indicate that it is possible to input two real sequences into the channels of a complex input FFT structure and to obtain an output corresponding to the scrambled transforms of the two input sequences. However, as is indicated by the form of equations (8a)–(8d), the unscrambling process requires substantial extra hardware. The alternative, involving the use of two entirely separate FFT structures, is also inefficient in its use of hardware.

However, it has been recognized that it is possible to restate equations (8a)–(8d) as:

$$\begin{aligned} 2Re\chi_1(k) &= Re\,G(k) + e^{j\theta}Re\,G(N-k) \\ &= Re\,[G(k) + e^{j\theta}G(N-k)] \end{aligned} \quad (9a)$$

$$\begin{aligned} 2Re\chi_2(k) &= Im\,G(k) + e^{j\theta}Im\,G(N-k) \\ &= Im\,[G(k) + e^{j\theta}G(N-k)] \end{aligned} \quad (9b)$$

$$\begin{aligned} -2Im\chi_2(k) &= Re\,G(k) - e^{j\theta}Re\,G(N-k) \\ &= Re\,[G(k) - e^{j\theta}G(N-k)], \text{ and} \end{aligned} \quad (9c)$$

$$\begin{aligned} 2Im\chi_1(k) &= Im\,G(k) - e^{j\theta}Im\,G(N-k) \\ &= Im\,[G(k) - e^{j\theta}G(N-k)]. \end{aligned} \quad (9d)$$

As is apparent, equations (9a)–(9d) readily reduced:

$$2Re\chi_1(k) + j2Re\chi_2(k) = G(k) + e^{j\theta}G(N-k), \text{ and} \quad (10)$$

$$-2Im\chi_2(k) + j2Im\chi_1(k) = G(k) - e^{j\theta}G(N-k). \quad (11)$$

Note that the left hand sides of equation 10 and 11 are the substantially unscrambled transforms which are the desired outputs. The minor amount of manipulation required to obtain the precise output desired is discussed below. The right hand side of equations 10 and 11 are of the same form as the functions which an FFT structure is designed to compute. Therefore, it should be possible to rearrange the outputs of a standard FFT structure so that the structure itself can serve as the unscrambling hardware which is necessary when processing two real sequences.

FIG. 1 is a detailed block diagram of a particular type of FFT structure which is suitable for implementing the present invention. The structure of FIG. 1 is recursive in that the same hardware is used to perform each stage of the transform. The particular structure performs N-point FFT in log$_2$ N stages. In a real input FFT implementation, the first sequence of data is supplied to the structure via I channel input 11 and the second sequence of data is supplied via Q channel input 12. The details of the manner in which data is supplied are discussed below with reference to FIGS. 2 and 3. All of the incoming data is first passed through one of a set of multiplexing registers 13. Multiplexing registers 13 serve to select either new data on one of the input channels or an output of a previous stage of the computation as the input to the upcoming stage.

The computations necessary for each stage of the FFT are performed in a pair of complex multipliers 14 and 15. Complex multiplier 14 is associated with the I channel of the structure and receives inputs from the two multiplexing registers 13 coupled to I channel input 11. Similarly complex multiplier 15 is associated with the Q channel of the structure and receives inputs from the two multiplexing registers 13 which are coupled to the Q channel input 12. Each complex multiplier also receives inputs from an angle and weighting PROM 16. PROM 16 supplies the necessary phase angles for the computations, as is discussed below, and also supplies a weighting function which is used to reduce sidelobes in the output spectrum. The use of weighting functions is well known in the art and will not be discussed in detail herein.

Each complex multiplier comprises a pair of scalar multipliers 19, a summation circuit 20 coupled to the outputs of the scalar multipliers, a pair of registers 21 inserted for timing purposes and a final pair of summation circuits 22. Complex multipliers 14 and 15 generate complex functions of the form $$F_1 = A + e^{j\theta}B, \text{ and} \quad (12a)$$

$$F_2 = A - e^{j\theta}B \quad (12b)$$

The four outputs of complex multipliers 14 and 15 are coupled to a first set of registers 24 which, in turn, are coupled to a memory structure 25. The outputs of complex multipliers 14 and 15 are also coupled to a second set of registers 26 which serve to supply the outputs to output line 27 after the final pass through the structure. Memory structure 25 receives the output of each pass through complex multipliers 14 and 15 and reorders the results for input during the next pass. Memory structure 25 comprises a pair of I channel memory devices 29, a pair of Q channel memory devices 30, a memory controller 31 and a bank of four multiplexing registers 32. The outputs of memory structure 25 are supplied to multiplexing registers 13 and, via a pair of resettable registers 33, to summing circuits 22. As is apparent, the first pass through the structure for each point in the transform includes no inputs from memory structure 25. Therefore, registers 33 are resettable to provide zero inputs at that time.

The FFT structure of FIG. 1 is only one of many well known methods for implementing the necessary functions. Various modifications and details of operation of the structure of FIG. 1 will be apparent to one skilled in the art and may be made without affecting the principles of the present invention.

Figure 2:
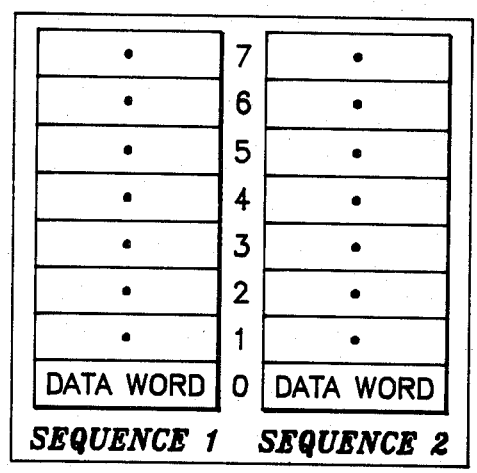
FIG. 2 is a diagram illustrating the nomenclature used in describing an eight point real input FFT according to the principles of the present invention.
Figure 3:
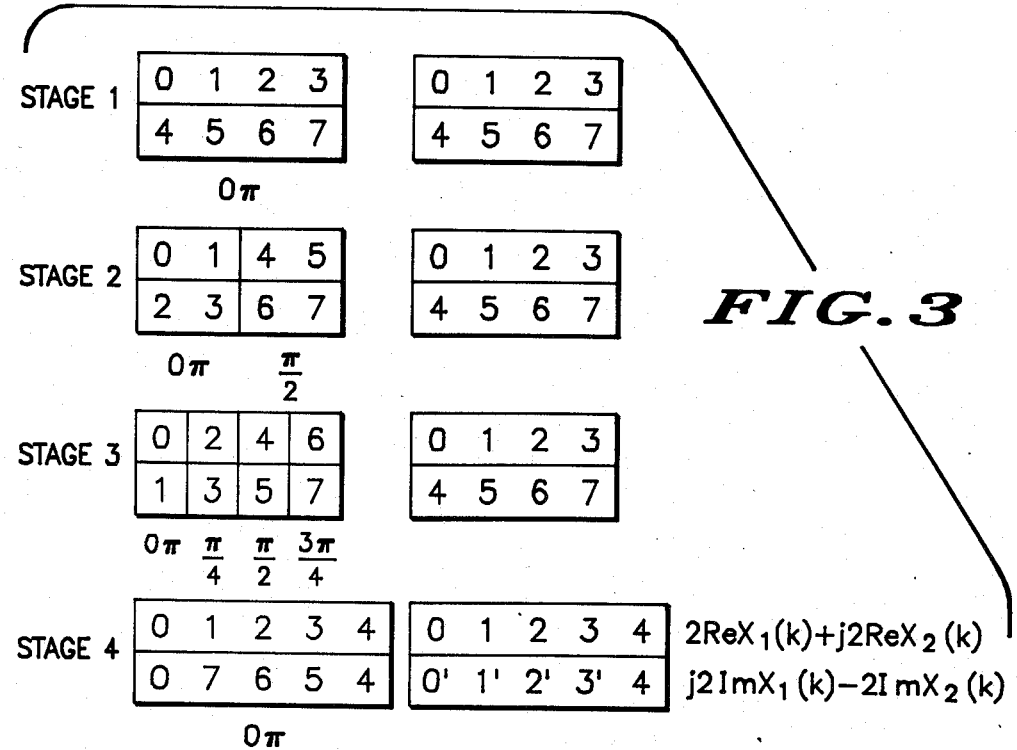
FIG. 3 is a diagram illustrating the pairing and reordering necessary to perform an eight point real input FFT utilizing the structure of FIG. 1 according to the principles of the present invention.

Referring to FIGS. 2 and 3, the particular details of operating the structure of FIG. 1 according to the principles of the present invention are described. For purposes of illustration, an 8 point transform is described in detail. In other words, each of the two input sequences comprises 8 data words numbered from 0 to 7. The first data word in each sequence is number 0 and the last is number 7. The data words may be for example, digitized time domain samples of an analog waveform.

The standard method of operating an apparatus such as is shown in FIG. 1 to perform simultaneous real input FFT's is to arrange each sequence in pairs of data words and input each pair into the appropriate channel of the structure simultaneously. For example, at the start of stage 1 of an 8 point FFT, data words 0 and 4 of sequence 1 are supplied to I channel input 11 and data words 0 and 4 of sequence 2 are supplied to Q channel input 12. Next, data words 1 and 5 are input, followed by the pair 2,6 and finally the pair 3,7. This is summarized in the stage 1 input block of FIG. 3. As is also indicated, the phase angle supplied by PROM 16 to scalar multipliers 19 throughout the stage 1 computation is $0\pi$. When the stage 1 processing is complete the sequence of output pairs is 0,4; 1,5; 2,6 and 3,7. Thus, it is apparent that each stage of the processing involves the input of 4 (i.e. N/2) pairs for each sequence and the evaluation of the functions of equations (12a) and (12b) for each input pair.

For input during stage 2 of the computation the data pairs must be rearranged. Memory controller 31, which supplies addresses to the four memory devices, provides this function. The first two input pairs for stage 2 are 0,2 and 1,3. As is indicated in FIG. 3, the phase angle applied to these two pairs is $0\pi$. The second two input pairs at stage 2 are 4,6 and 5,7. The phase angle is $\pi/2$. The output sequence for stage 2 is identical to that for stage 1.

At stage 3 a further reordering of the input pairs and variation of the phase angles is performed as indicated by the stage 3 input block of FIG. 3. The pair 0,1 is input with a phase angle of $0\pi$. The pair 2,3 is input with a phase angle of $\pi/4$. The pair 4,5 is input with a phase angle of $\pi/2$. Finally, the pair 6,7 is input with a phase angle of $3\pi/4$. Once again the output sequence is identical to that for the previous stages. In prior art implementations, stage 3 would be the final stage of processing and the output would be interpreted according to equations (8a)–(8d). Unscrambling hardware at output line 27 would alter the data to achieve the desired FFT output functions.

In the method of operating the apparatus of FIG. 1 according to the principles of the present invention, the outputs of stage 3 are further reordered and applied once again as the inputs to complex multipliers 14 and 15. The input pairs are 0,0; 1,7; 2,6; 3,5; and 4,4. The fact that there are now five input pairs is accounted for by the fact that words 0 and 4 are paired with themselves for input. The phase angle applied for each of the five input pairs is $0\pi$. As is indicated by the output block of stage 4, the output is interpreted as representing only the five data words numbered 0–4. This is related to the symmetry of the output function. As is indicated in FIG. 3 the sequence consisting of the first word in each output pair represents the function defined by equation (10) and the sequence comprising the second word of each output pair represents the function defined by equation (11).

In order to obtain the desired functions at the output, it is necessary to combine the real part of the first word with the imaginary part of the second word and the imaginary part of the first word with the real part of the second word. Both of these combinations must be right shifted by one (that is, divided by two) in order to obtain the proper magnitude at the output. As will be apparent to one skilled in that art, this rearrangement and division requires only a wiring change at output 27. In other words, the output wiring is re-arranged to shift the digits of the output words one place to the right, which is equivalent to dividing a binary value by 2. In addition, the output wiring representing the imaginary portion of the first output word is swapped for the wiring representing the imaginary portion of the second output word. It should be noted however, that the transform of the second sequence is inverted. In many applications of real input FFT's, this will not be important. However, if the phase of the output must be preserved, a simple inversion process requiring very little hardware may be implemented.

The method disclosed above for utilizing a two channel recursive FFT structure results in substantial savings of time and or hardware over previous methods. Since an extra stage of operation must be added to perform the unscrambling, the savings is not quite 50%. For a 1024 point transform, for instance, it is possible to perform all of the necessary operations in approximately 59.1% of the number of clock cycles required by prior art methods.

While the present invention has been particularly shown and described with reference to a preferred embodiment thereof, various modifications and changes thereto may be made by one skilled in the art without departing from the spirit and scope thereof.

I claim:

1. A method of performing real input FFT's simultaneously on two sequences of digital data comprising the steps of:

applying said sequences simultaneously to two orthogonally related complex function generators in a predetermined manner;

operating said complex function generators to produce outputs thereof;

storing said outputs of said complex function generators;

applying said stored outputs to said function generators in a predetermined manner;

repeating said steps of, operating and storing a predetermined number of times and repeating said step of applying said stored outputs said predetermined number of times minus one;

re-ordering said stored outputs of a final repetition of said steps of applying said stored outputs, operating and storing in a predetermined manner;

applying said re-ordered outputs to said function generators; and operating said function generators to produce substantially unscrambled FFT outputs corresponding to said digital data sequences.

2. A method according to claim 1 wherein each said function generator further comprises a complex multiplier and said steps of applying said sequences to said function generators further comprises the steps of:

arranging each of said sequences in pairs according to a time domain ordering scheme; and applying said pairs of one of said sequences to a first of said complex multipliers and applying said pairs of the other of said sequences to a second of said complex multipliers.

3. A method according to claim 2 wherein said operating step comprising the step of:

applying a predetermined angle value to each said complex multiplier with each said pair.

4. A method according to claim 2 wherein said steps of storing said outputs and applying said stored outputs further comprise the steps of:

receiving two complex values, one from each of said complex multipliers, each said complex value comprising a real and an imaginary part;

storing said four parts of said two complex values in four memory locations; and addressing said four memory locations in a predetermined manner and providing the outputs of said memory locations to said complex multipliers as input thereto.

* * * * *